United States Patent
Kawasaki et al.

(10) Patent No.: US 9,373,867 B2
(45) Date of Patent: Jun. 21, 2016

(54) SECONDARY BATTERY AND ELECTROLYTE LIQUID

(75) Inventors: Daisuke Kawasaki, Tokyo (JP); Kenichi Shimura, Tokyo (JP); Yoko Hashizume, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/004,347

(22) PCT Filed: Sep. 27, 2011

(86) PCT No.: PCT/JP2011/072034
§ 371 (c)(1),
(2), (4) Date: Sep. 10, 2013

(87) PCT Pub. No.: WO2012/132059
PCT Pub. Date: Oct. 4, 2012

(65) Prior Publication Data
US 2014/0017559 A1 Jan. 16, 2014

(30) Foreign Application Priority Data
Mar. 28, 2011 (JP) ................................ 2011-070108

(51) Int. Cl.
*H01M 10/0566* (2010.01)
*H01M 4/34* (2006.01)
*H01M 4/38* (2006.01)
(Continued)

(52) U.S. Cl.
CPC .......... *H01M 10/0566* (2013.01); *H01M 4/364* (2013.01); *H01M 4/386* (2013.01); *H01M 4/485* (2013.01); *H01M 4/587* (2013.01); *H01M 10/052* (2013.01); *H01M 10/0567* (2013.01); *H01M 10/0569* (2013.01); *H01M 4/622* (2013.01); *H01M 2300/004* (2013.01); *H01M 2300/0034* (2013.01); *H01M 2300/0037* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

2001/0009744 A1* 7/2001 Kim et al. ..................... 429/326
2002/0034692 A1* 3/2002 Appel .................. H01M 6/164
429/341

(Continued)

FOREIGN PATENT DOCUMENTS

CN 101707260 A 5/2010
CN 101752547 6/2010
(Continued)

OTHER PUBLICATIONS

IPDL Machine Translation of the Detailed Description of JP 11-126632A (May 1999).*
(Continued)

*Primary Examiner* — Gregg Cantelmo
(74) *Attorney, Agent, or Firm* — Finnegan, Henderson, Farabow, Garrett & Dunner LLP (57) ABSTRACT

The object is to provide a secondary battery which has an excellent cycle property even in high-temperature environment and which has small resistance increase even when it is used in high-temperature environment. An exemplary embodiment of the invention is a secondary battery, comprising: a positive electrode, a negative electrode, and an electrolyte liquid; wherein the electrolyte liquid comprises a chain-type fluorinated sulfone compound represented by a predetermined formula.

14 Claims, 1 Drawing Sheet

(51) Int. Cl.
*H01M 4/48* (2010.01)
*H01M 4/58* (2010.01)
*H01M 10/052* (2010.01)
*H01M 10/0567* (2010.01)
*H01M 10/0569* (2010.01)
*H01M 4/62* (2006.01)
*H01M 4/36* (2006.01)
*H01M 4/485* (2010.01)
*H01M 4/587* (2010.01)

(56) References Cited

U.S. PATENT DOCUMENTS

| | | | |
|---|---|---|---|
| 2004/0038133 A1* | 2/2004 | Yamaguchi et al. | 429/326 |
| 2006/0068287 A1* | 3/2006 | Morita et al. | 429/223 |
| 2006/0127777 A1* | 6/2006 | Ihara | H01M 4/38 429/326 |
| 2007/0054190 A1* | 3/2007 | Fukui et al. | 429/218.1 |
| 2007/0231684 A1* | 10/2007 | Takano et al. | 429/161 |
| 2008/0057400 A1* | 3/2008 | Nanno | C08J 5/18 429/254 |
| 2009/0311581 A1* | 12/2009 | Park et al. | 429/62 |
| 2009/0311592 A1* | 12/2009 | You et al. | 429/162 |
| 2010/0124708 A1* | 5/2010 | Matsui et al. | 429/332 |

FOREIGN PATENT DOCUMENTS

| | | |
|---|---|---|
| JP | 06-325765 | 11/1994 |
| JP | 11-026015 | 1/1999 |
| JP | 11-126632 | 5/1999 |
| JP | 2000-021447 | 1/2000 |
| JP | 2001-223024 | 8/2001 |
| JP | 2003-123740 | 4/2003 |
| JP | 2004-047404 | 2/2004 |
| JP | 2006-114285 | 4/2006 |
| JP | 2008-192504 | 8/2008 |
| JP | 2010-123287 | 6/2010 |
| WO | WO 9919932 A1 * | 4/1999 |

OTHER PUBLICATIONS

International Search Report issued from the Japanese Patent Office in corresponding International Application No. PCT/JP2011/072034, dated Dec. 27, 2011, 2 pages.

Office Action issued by the Chinese Patent Office in counterpart Chinese Patent Application No. 201180069587.6 dated Apr. 1, 2015.

* cited by examiner

SECONDARY BATTERY AND ELECTROLYTE LIQUID

CROSS-REFERENCE TO RELATED PATENT APPLICATIONS

This application is a National Stage Entry of International Application No. PCT/JP2011/072034, filed Sep. 27, 2011, which claims priority from Japanese Patent Application No. 2011-070108, filed Mar. 28, 2011. The entire contents of the above-referenced applications are expressly incorporated herein by reference.

TECHNICAL FIELD

An exemplary embodiment of the present invention relates to a secondary battery and an electrolyte liquid used for the same, and particularly to a lithium ion secondary battery and an electrolyte liquid used for the same.

BACKGROUND ART

With the rapidly expansion of the market for laptop computers, mobile phones, electric vehicles, and the like, a secondary battery having a high energy density is expected. Examples of a method for obtaining a secondary battery having a high energy density include a method in which a negative electrode material having a large capacity is used, and a method in which a non-aqueous electrolyte liquid having an excellent stability is used.

As for the negative electrode material, using silicon or silicon oxide as a negative electrode active material has been tried as disclosed in, for example, Patent Documents 1 to 3. Patent Document 1 discloses using a silicon oxide or a silicate as a negative electrode active material of a secondary battery. Patent Document 2 discloses a negative electrode for a secondary battery which has an active material layer containing a carbon material particle that can absorb and desorb lithium ion, a metal particle that can be alloyed with lithium, and an oxide particle that can absorb and desorb lithium ion. Patent Document 3 discloses a negative electrode material for a secondary battery which is formed by coating the surface of a particle, which has a structure in which a silicon fine crystal is dispersed in a silicon compound, with carbon. The negative electrode active materials described in Patent Documents 2 and 3 have an effect of reducing volume change as the entire negative electrode.

As for the electrolyte liquid, using an electrolyte liquid containing another compound in addition to a conventional non-aqueous electrolyte liquid has been tried as disclosed in, for example, Patent Documents 4 to 6.

Patent Document 4 discloses using an electrolyte containing an asymmetric non-cyclic sulfone and a chain-type ester compound.

Patent Documents 5 and 6 disclose using a non-aqueous electrolyte liquid containing a fluorinated ether.

Patent Document 7 discloses, in the Examples, an electrolyte liquid containing any compound among fluorine-containing ethers, fluorine-containing esters, and fluorine-containing carbonates.

CITATION LIST

Patent Document

Patent document 1: JP 6-325765 A
Patent document 2: JP 2003-123740 A
Patent document 3: JP 2004-47404 A
Patent document 4: JP 2000-21447 A
Patent document 5: JP 11-26015 A
Patent document 6: JP 2010-123287 A
Patent document 7: JP 2008-192504 A

SUMMARY OF THE INVENTION

Problem to be Solved by the Invention

As mentioned above, studies regarding the negative electrode active material or the electrolyte liquid are carried out. In the field of the secondary battery, there is a problem of deterioration of the cycle property when it is charged and discharged specifically in high-temperature environment, and a technical development which can solve the problem is anticipated. Also, change in resistance during use, particularly resistance increase, easily occurs in high-temperature environment. When the battery resistance increases, some problems, such as deterioration of input-output property represented by deterioration of rapid charge function and an increase of energy loss due to heat generation, arise.

Also, the secondary battery is expected to have small volume increase when it is repeatedly charged and discharged.

Thus, an object of an exemplary embodiment of the present invention is to provide a secondary battery which has an excellent cycle property even in high-temperature environment, which has small resistance increase even when it is used in high-temperature environment, and which has a reduced volume increase.

Means of Solving the Problem

One of the exemplary embodiments of the present inventions is:

a secondary battery, comprising: a positive electrode, a negative electrode, and an electrolyte liquid;

wherein the electrolyte liquid comprises a chain-type fluorinated sulfone compound represented by following formula (1):

(1)

wherein, in formula (1), $R_1$ and $R_2$ each independently denote a substituted or non-substituted alkyl group or a substituted or non-substituted aryl group, and at least one of $R_1$ and $R_2$ comprises fluorine atom.

Also, one of the exemplary embodiments of the present inventions is:

an electrolyte liquid for a secondary battery, comprising a chain-type fluorinated sulfone compound represented by above-mentioned formula (1).

Effect of the Invention

According to an exemplary embodiment of the present invention, a secondary battery, which has an excellent cycle property even in high-temperature environment and which has small resistance increase even when it is used in high-temperature environment, can be provided.

MODE FOR CARRYING OUT THE INVENTION

As follows, an exemplary embodiment of the invention is explained in detail.
[1] Electrolyte Liquid An electrolyte liquid in an exemplary embodiment of the invention contains a chain-type fluorinated sulfone compound represented by following formula (1). It is presumed that a stable coating (so-called, solid fluid interphase film, SEI film) is formed on a surface of a negative electrode by using an electrolyte liquid containing a chain-type fluorinated sulfone compound, and thereby deterioration of battery property can be reduced. That is, it is presumed that a high reactive chain-type fluorinated sulfone compound is selectively reacted with the surface of a negative electrode to form a stable coating, and thereby that the gas generation due to decomposition of the electrolyte liquid in negative electrode is effectively reduced and deterioration of a battery property in high-temperature environment is reduced.

(1)

In formula (1), $R_1$ and $R_2$ each independently denote a substituted or non-substituted alkyl group or a substituted or non-substituted aryl group, and at least one of $R_1$ and $R_2$ contains fluorine atom.

In formula (1), the carbon number of the alkyl group in $R_1$ and $R_2$ is preferably 1 to 12, is more preferably 1 to 8, is further preferably 1 to 6, and is particularly preferably 1 to 4. The carbon number of the aryl group is preferably 6 to 18, is more preferably 6 to 12, and is further preferably 6 to 10.

At least one of $R_1$ and $R_2$ contains fluorine atom. Thus, it is preferable that at least one of $R_1$ and $R_2$ has fluorine atom as a substituent, and it is preferable that at least one of $R_1$ and $R_2$ is a fluorine-substituted alkyl group. The fluorine-substituted alkyl group denotes a substituted alkyl group which has a structure obtained by substituting at least one hydrogen atom of non-substituted alkyl group by fluorine atom. As well, examples of the alkyl group include straight-chain-type groups, branched-chain-type groups, and cyclic-type groups, but the fluorine-substituted alkyl group is preferably straight-chain-type.

In $R_1$ and $R_2$, examples of another substituent include, for example alkyl groups with a carbon number of 1 to 6 (for example, methyl group, ethyl group, propyl group, isopropyl group, and butyl group), aryl groups with a carbon number of 6 to 10 (for example, phenyl group and naphthyl group), and halogen atoms (for example, chlorine atom and bromine atom).

It is preferable that $R_1$ and $R_2$ are each independently a fluorine-substituted alkyl group. Also, it is preferable that $R_1$ and $R_2$ are each independently a fluorine-substituted alkyl group with a carbon number of 1 to 6, and it is more preferable that they are each independently a fluorine-substituted alkyl group with a carbon number of 1 to 4.

Also, in formula (1), it is preferably that one of $R_1$ and $R_2$ is a fluorine-substituted alkyl group with a carbon number of 1 to 6, and that the other is an alkyl group with a carbon number of 1 to 6 which may be substituted by an aryl group or is an aryl group with a carbon number of 6 to 10 which may be substituted by an alkyl group.

The chain-type fluorinated sulfone compound can be used alone, or in combination with two or more kinds.

The content of the chain-type fluorinated sulfone compound in the electrolyte liquid is not particularly limited, but is preferably 0.01 to 30 mass %, is more preferably 0.1 to 20 mass %, and is further preferably 1 to 10 mass %. When the content of the chain-type fluorinated sulfone compound is 0.1 mass % or more, the coating can be effectively formed on the surface of the negative electrode and decomposition of the electrolyte liquid can be effectively reduced. Also, when the content of the chain-type fluorinated sulfone compound is 30 mass % or less, an increase in the internal resistance of the battery due to excessive generation of the SEI film can be reduced.

Also, in an exemplary embodiment of the invention, it is preferable that the electrolyte liquid further contains a chain-type fluorinated ether compound represented by following formula (2). By using an electrolyte liquid containing a chain-type fluorinated sulfone compound and a chain-type fluorinated ether compound, the cycle maintenance rate in high-temperature environment can be further improved and an increase in resistance after the high-temperature cycle can be further reduced.

(2)

In formula (2), $R_a$ and $R_b$ each independently denote an alkyl group or a fluorine-substituted alkyl group, and at least one of $R_a$ and $R_b$ is a fluorine-substituted alkyl group.

In $R_a$ and $R_b$, the carbon number of the alkyl group is preferably 1 to 12, is more preferably 1 to 8, is further preferably 1 to 6, and is particularly preferably 1 to 4. Also, in formula (2), examples of the alkyl group include straight-chain-type groups, branched-chain-type groups, and cyclic-type groups, but the alkyl group is preferably straight-chain-type.

At least one of $R_a$ and $R_b$ is a fluorine-substituted alkyl group. The fluorine-substituted alkyl group denotes a substituted alkyl group which has a structure obtained by substituting at least one hydrogen atom of non-substituted alkyl group by fluorine atom. Also, the fluorine-substituted alkyl group is preferably straight-chain-type. Also, it is preferable that $R_a$ and $R_b$ are each independently a fluorine-substituted alkyl group with a carbon number of 1 to 6, and it is more preferable that they are each independently a fluorine-substituted alkyl group with a carbon number of 1 to 4.

From the standpoint of the voltage resistance and the compatibility with another electrolyte, the chain-type fluorinated ether is preferably a compound represented by following formula (3):

(3)

wherein, in formula (3), n is 1 to 8 and $Y^1$ to $Y^8$ are each independently fluorine atom or hydrogen atom provided that at least one of $Y^1$ to $Y^3$ is fluorine atom and that at least one of $Y^4$ to $Y^8$ is fluorine atom.

In formula (3), $Y^2$ and $Y^3$ may each be independent in every n.

Also, from the standpoint of viscosity of the electrolyte liquid and the compatibility with another electrolyte such as a chain-type fluorinated sulfone, the chain-type fluorinated ether is preferably represented by following formula (4):

$$H—(CX^1X^2—CX^3X^4)_n—CH_2O—CX^5X^6— CX^7X^8—H \qquad (4).$$

In formula (4), n is 1, 2, 3, or 4. $X^1$ to $X^8$ are each independently fluorine atom or hydrogen atom. Provided that at least one of $X^1$ to $X^4$ is fluorine atom and at least one of $X^5$ to $X^8$ is fluorine atom. $X^1$ to $X^4$ may each be independent in every n.

In formula (4), n is preferably 1 or 2, and n is more preferably 1.

Also, in formula (4), the atom ratio [(total number of fluorine atom)/(total number of hydrogen atom)] is preferably 1 or more.

Examples of the chain-type fluorinated ether compound include, for example, $CF_3OCH_3$, $CF_3OC_2H_6$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, and $CF_3CHFCF_2CH_2OCHF_2$.

The content of the chain-type fluorinated ether compound in the electrolyte liquid is, for example, 1 to 70 mass %. Also, the content of the chain-type fluorinated ether compound in the electrolyte liquid is preferably 5 to 60 mass %, is more preferably 7 to 50 mass %, and is further preferably 10 to 40 mass %. When the content of the chain-type fluorinated ether compound is 60 mass % or less, dissociation of Li ion in the supporting salt easily occur, and the electroconductivity of the electrolyte liquid is improved. Also, when the content of the chain-type fluorinated ether compound is 5 mass % or more, it is thought that reduction decomposition of the electrolyte liquid on the negative electrode is easily reduced.

Examples of the solvent which can be used as the electrolyte liquid include, for example, aprotic solvents such as: cyclic-type carbonates such as propylene carbonate (PC), ethylene carbonate (EC), butylene carbonate (BC), and vinylene carbonate (VC); chain type carbonates such as dimethyl carbonate (DMC), diethyl carbonate (DEC), ethyl methyl carbonate (EMC), and dipropyl carbonate (DPC); propylene carbonate derivatives; and aliphatic carboxylates such as methyl formate, methyl acetate, and ethyl propionate. This aprotic solvent can be used alone, or in combination with two or more kinds.

The electrolyte liquid preferably contains a carbonate compound (non-fluorinated) as a solvent. By using a carbonate compound, ion dissociation of the electrolyte liquid is improved, and viscosity of the electrolyte liquid is also decreased. Therefore, ionic mobility can be improved. Examples of the carbonate compound include cyclic-type carbonates and chain-type carbonates as mentioned above. Examples of the carbonate compound include, for example, ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and dipropyl carbonate (DPC), as mentioned above. The electrolyte liquid preferably contains a carbonate compound as a main solvent. The content of the carbonate compound in the solvent is preferably 60 vol % or more, is more preferably 70 vol % or more, is further preferably 80 vol % or more, and is particularly preferably 90 vol % or more.

Examples of the solvent other than those mentioned above include, for example, γ-lactones such as γ-butyrolactone; chain-type ethers such as 1,2-ethoxyethane (DEE) and ethoxy methoxy ethane (EME); cyclic-type ethers such as tetrahydrofuran and 2-methyl tetrahydrofuran; aprotic organic solvents such as dimethylsulfoxide, 1,3-dioxolan, formamide, acetamide, dimethylformamide, dioxolane, acetonitrile, propylnitrile, nitromethane, ethyl monoglyme, phosphoric acid triesters, trimethoxy methane, dioxolane derivatives, sulfolane, methyl sulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole, N-methylpyrrolidone, and fluorinated carboxylates. These can be used alone, or in combination with two or more kinds.

An electrolyte liquid in an exemplary embodiment of the invention particularly preferably contains a chain-type fluorinated sulfone compound, a chain-type fluorinated ether compound, and a carbonate compound. There is an advantage that ion dissociation of the electrolyte liquid is improved because the carbonate compound has a large dielectric constant, and that ionic mobility is further improved because viscosity of the electrolyte liquid is decreased. However, when a carbonate compound having a carbonate structure is used as the electrolyte liquid, the carbonate compound is decomposed and gas comprising $CO_2$ tends to be easily generated. In particular, in the case of a stacked laminate type secondary battery, if gas is generated inside, a problem of swollenness is generated and easily results in a performance decrease. In an exemplary embodiment of the invention, even if a carbonate compound is contained as a solvent, it has been found that the maintenance rate of the cycle property and an increase in resistance are further improved and that the swollenness due to the gas generation is further significantly reduced, by containing both a chain-type fluorinated sulfone compound and a chain-type fluorinated ether compound. This is thought to be not only due to an effect of the SEI film formation by a chain-type sulfone compound, but also due to a synergistic effect by a chain-type fluorinated sulfone compound and a chain-type fluorinated ether compound. In other words, although the mechanism of obtaining the effect is not explicitly clear, it is thought that an effect of further reducing gas generation can be obtained by coexistence of a chain-type fluorinated sulfone compound, a chain-type fluorinated ether compound and a carbonate compound. Here is a presumption, namely the presumption that decomposition of the electrolyte liquid is further reduced by causing a chain-type fluorinated ether compound to be coordinated with and be adsorbed in a SEI film formed by a chain-type fluorinated sulfone compound. Note that, the above-mentioned consideration is only a presumption and does not limit the present invention.

In this case, it is preferable that the content of the chain-type fluorinated sulfone compound is 1 to 15 vol % with respect to the total of the chain-type fluorinated sulfone compound, the chain-type fluorinated ether compound, and the solvent; that the content of the chain-type fluorinated ether compound is 10 to 35 vol % with respect to the total of the chain-type fluorinated sulfone compound, the chain-type fluorinated ether compound, and the solvent; and that the content of the carbonate compound is 30 to 89 vol % with respect to the total of the chain-type fluorinated sulfone compound, the chain-type fluorinated ether compound, and the solvent. Further, the content of the chain-type fluorinated sulfone compound is preferably 2 to 12 vol %. Also, the content of the chain-type fluorinated ether compound is preferably 15 to 30 vol % with respect to the total of the chain-type fluorinated sulfone compound, the chain-type fluorinated ether compound, and the solvent. Also, the content of the carbonate compound is preferably 50 to 80 vol % with respect to the total of the chain-type fluorinated sulfone compound, the chain-type fluorinated ether compound, and the solvent, and is more preferably 55 to 75 vol %.

The electrolyte liquid can further contain a supporting salt. Examples of the supporting salt include, for example, lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$ and $LiN(CF_3SO_2)_2$. The supporting salt can be used alone, or in combination with two or more kinds. The concentration of the supporting salt in the electrolyte liquid is preferably 0.5 to 1.5 mol/l. By setting the concentration of the supporting salt to be in this range, it is easy to adjust the density, viscosity, electroconductivity, and the like.

[2] Negative Electrode

A lithium secondary battery of an exemplary embodiment of the invention has a negative electrode containing a negative electrode active material. The negative electrode active material can be bound on a negative electrode collector with a negative electrode binder.

A negative electrode active material in an exemplary embodiment of the invention is not limited, and examples thereof include, for example, metal (a) that can be alloyed with lithium, metal oxide (b) that can absorb and desorb lithium ion, and carbon material (c) that can absorb and desorb lithium ion.

Examples of metal (a) include, for example, Al, Si, Pb, Sn, In, Bi, Ag, Ba, Ca, Hg, Pd, Pt, Te, Zn, La, or an alloy of two or more kinds thereof. Also, this metal or alloy can be used in combination with two or more kinds. Also, this metal or alloy can contain one or more non-metal element. In an exemplary embodiment of the invention, it is preferable to use silicon as the negative electrode active material. Silicon is an element whose Clarke number is second place following oxygen, and the amount of the resources is abundant. Also, the charge capacity thereof shows approximately 4200 mAh/g which is higher than another metal. Therefore, by using silicon as the negative electrode active material, a lithium ion battery, in which the weight energy density and volume energy density are excellent and the restriction regarding the resources is little, can be provided. Also, as the negative electrode active material, tin can be used, and it is preferable to use tin and silicon, and it is more preferable to use an alloy of tin and silicon. The content of metal (a) in the negative electrode active material may be 0 mass % and may be 100 mass %, but is preferably 5 mass % or more and 95 mass % or less, is more preferably 10 mass % or more and 90 mass % or less, and is further preferably 20 mass % or more and 50 mass % or less.

In the case of a negative electrode containing silicon, there was a problem that volume increase due to repeated charge and discharge was large. However, it has been found that the volume change due to charge and discharge can be reduced by using an electrolyte liquid containing a chain-type fluorinated sulfone compound and a chain-type fluorinated ether compound. As for the mechanism of an exemplary embodiment of the invention, as mentioned above, a chain-type fluorinated ether compound is presumed to be coordinated or adsorbed to a coating formed by a chain-type fluorinated sulfone compound, thereby to further reduce decomposition of electrolyte liquid, and this phenomenon is thought to be particularly significant in a negative electrode containing silicon. Thus, in an exemplary embodiment of the invention, particular advantageous effect can be obtained by using a negative electrode containing silicon.

Examples of metal oxide (b) include, for example, silicon oxide, aluminum oxide, tin oxide, indium oxide, zinc oxide, lithium oxide, or a complex thereof. In an exemplary embodiment of the invention, silicon oxide is preferably used as the negative electrode active material. This is because silicon oxide is relatively stable and it is difficult for silicon oxide to cause a reaction with another compound. Also, one element or two or more elements selected from nitrogen, boron and sulfur can be added to metal oxide (b), for example, in an amount of 0.1 to 5 mass %. By this, electroconductivity of metal oxide (b) can be improved. The content of metal oxide (b) in the negative electrode active material may be 0 mass % and may be 100 mass %, but is preferably 5 mass % or more and 90 mass % or less, is more preferably 40 mass % or more and 80 mass % or less, and is further preferably 50 mass % or more and 70 mass % or less.

Examples of carbon material (c) include, for example, carbon, amorphous carbon, diamond-like carbon, carbon nanotube, or a complex thereof. Here, carbon having a high crystallinity has high electroconductivity and an excellent adhesiveness with a negative electrode collector consisting of copper or the like as well as an excellent voltage flatness. On the other hand, since amorphous carbon having a low crystallinity has relatively low volume expansion, there is a high effect of reducing volume expansion of the whole of the negative electrode, and it is difficult for deterioration due to ununiformity such as a crystal grain boundary or a defect to occur. The content of carbon material (c) in the negative electrode active material may be 0 mass % and may be 100 mass %, but is preferably 2 mass % or more and 50 mass % or less, and is more preferably 2 mass % or more and 30 mass % or less.

An negative electrode active material in an exemplary embodiment of the invention preferably contains metal (a) that can be alloyed with lithium, metal oxide (b) that can absorb and desorb lithium ion, and carbon material (c) that can absorb and desorb lithium ion. Also, it is preferable that metal (a) is silicon and metal oxide (b) is silicon oxide. In other words, the negative electrode active material preferably comprises a complex of silicon, silicon oxide, and carbon material (hereinafter, referred to as Si/SiO/C complex). Further, all or a part of metal oxide (b) preferably has an amorphous structure. Metal oxide (b) having an amorphous structure can reduce volume expansion of carbon material (c) or metal (a) that are another negative electrode active material. This mechanism is not clear, but the amorphous structure of metal oxide (b) is presumed to have some influences on a coating formation at an interface between carbon material (c) and an electrolyte liquid. Also, the amorphous structure has a relatively small constituent due to ununiformity such as a crystal grain boundary or a defect. Note that, X-ray diffraction measurement (general XRD measurement) can confirm that all or a part of metal oxide (b) has an amorphous structure. Specifically, in the case where metal oxide (b) does not have an amorphous structure, a peak peculiar to metal oxide (b) is observed, while in the case where all or a part of metal oxide (b) has an amorphous structure, the observed peak peculiar to metal oxide (b) becomes to be broad.

In a Si/SiO/C complex, all or a part of silicon is preferably dispersed in silicon oxide. The dispersion of at least a part of silicon in silicon oxide can further reduce volume expansion of the negative electrode as a whole and can also reduce decomposition of an electrolyte liquid. Note that, it can be confirmed by transmission electron microscope observation (general TEM observation) and together with energy dispersive X-ray spectroscopy measurement (general EDX measurement) that all or a part of silicon is dispersed in silicon oxide. Specifically, a section of a specimen containing silicon particle is observed and an oxygen atom concentration of silicon particle which is dispersed in silicon oxide is measured, and thereby it can be confirmed that it does not become an oxide.

As mentioned above, in an exemplary embodiment of the invention, particular advantageous effect can be obtained by using a negative electrode containing silicon. In particular, a negative electrode active material containing silicon is preferably a Si/SiO/C complex. In an exemplary embodiment of the invention, by using a negative electrode active material comprising a Si/SiO/C complex and an electrolyte liquid containing a chain-type fluorinated sulfone compound and a chain-type fluorinated ether compound, a secondary battery, in which the cycle property, the resistance change ratio, and the volume increase ratio are further excellent, can be obtained.

For example, in a Si/SiO/C complex, all or a part of silicon oxide preferably has an amorphous structure and all or a part of silicon is preferably dispersed in silicon oxide. This Si/SiO/C complex can be produced, for example, by a method disclosed in Patent Document 3 (JP 2004-47404 A). That is, a CVD processing of silicon oxide is carried out in an atmosphere containing an organic substance gas such as methane gas, to obtain a Si/SiO/C complex. The Si/SiO/C complex obtained by this method has a structure in which the surface of a particle which comprises silicon oxide containing silicon is covered with carbon. Also, silicon is a nanocluster in silicon oxide.

In a Si/SiO/C complex, the ratio of silicon, silicon oxide, and carbon material is not particularly limited. The content of silicon is preferably 5 mass % more and 90 mass % or less with respect to the Si/SiO/C complex, and is preferably 20 mass % more and 50 mass % or less. The content of silicon oxide is preferably 5 mass % more and 90 mass % or less with respect to the Si/SiO/C complex, and is preferably 40 mass % more and 70 mass % or less. The content of carbon material is preferably 2 mass % more and 50 mass % or less with respect to the Si/SiO/C complex, and is preferably 2 mass % more and 30 mass % or less.

Also, a Si/SiO/C complex can comprise a mixture of silicon, silicon oxide, and carbon material, and can also be produced by mixing metal (a), metal oxide (b), and carbon material (c) by mechanical milling. For example, a Si/SiO/C complex can be obtained by mixing silicon, silicon oxide, and carbon material mix which are respectively in a particle state. For example, the average particle diameter of silicon can be constituted in a range smaller than the average particle diameter of carbon material and the average particle diameter of silicon oxide. By this constitution, since silicon in which volume change associated with charge and discharge is small has a relatively small particle diameter, and since carbon material and silicon oxide in which volume change is large has a relatively large particle diameter, the dendrite generation and the pulverization of alloy are more effectively reduced. Also, in the process of charge and discharge, lithium is absorbed and desorbed from the larger diameter particle, the smaller diameter particle and the larger diameter particle in this order. From this point, the residual stress and the residual strain are reduced. The average particle diameter of silicon can be, for example, 20 µm or less, and is preferably 15 µm or less. Also, it is preferable that the average particle diameter of metal oxide (b) is a half or less of the average particle diameter of carbon material (c), and it is preferable that the average particle diameter of metal (a) is a half or less of the average particle diameter of metal oxide (b). Further, it is more preferable that the average particle diameter of metal oxide (b) is a half or less of the average particle diameter of carbon material (c) as well as that the average particle diameter of metal (a) is a half or less of the average particle diameter of metal oxide (b). The control of the average particle diameter in this range can more effectively give the reduction effect of volume expansion of the metal and alloy phase, and can provide a secondary battery having an excellent balance of an energy density, a cycle life, and an efficiency. More specifically, it is preferable that the average particle diameter of silicon oxide (b) is a half or less of the average particle diameter of graphite (c) and that the average particle diameter of silicon (a) is a half or less of the average particle diameter of silicon oxide (b). Also, more specifically, the average particle diameter of silicon (a) can be, for example, 20 µm or less, and is preferably 15 µm or less.

A negative electrode binder is not particularly limited, but a polyvinylidene fluoride, a vinylidene fluoride-hexafluoropropylene copolymer, a vinylidene fluoride-tetrafluoroethylene copolymer, a styrene-butadiene copolymerized rubber, a polytetrafluoroethylene, a polypropylene, a polyethylene, a polyimide, a polyamide-imide, a polyacrylic acid, or the like can be used. Among these, from the standpoint of the strong binding property, a polyimide or a polyamide-imide is preferable. The amount of the negative electrode binder used is preferably 5 to 25 parts by mass with respect to 100 parts by mass of the negative electrode active material, from the standpoint of "sufficient binding force" and "high energy" which are trade-offs.

A negative electrode collector is preferably aluminum, nickel, stainless steel, chromium, copper, silver, and an alloy thereof from the electrochemical stability. Examples of the shape thereof include foil, flat plate, and mesh.

A negative electrode can be produced by forming a negative electrode active material layer containing a negative electrode active material and a negative electrode binder on a negative electrode collector. Examples of the method for forming the negative electrode active material layer include doctor blade method, die coater method, CVD method, and sputtering method. A negative electrode active material layer is first formed, and a thin film of aluminum, nickel, or an alloy thereof is thereafter formed by vapor deposition, sputtering, or the like to be a negative electrode.

[3] Positive Electrode

A positive electrode is formed, for example, by binding a positive electrode active material on a positive electrode collector with a positive electrode binder so that the positive electrode active material covers the positive electrode collector.

Examples of the positive electrode active material include lithium manganates having a lamellar structure or lithium manganates having a Spinel structure such as $LiMnO_2$ and $Li_xMn_2O_4$ ($0<x<2$); $LiCoO_2$, $LiNiO_2$, and compounds in which a part of the transition metal thereof are substituted by another metal; lithium transition metal oxides such as $LiNi_{1/3}Co_{1/3}Mn_{1/3}O_2$ in which the molar ratio of a particular transition metal is not more than one half; and compounds which have lithium at a larger amount than the stoichiometric amount in these lithium transition metal oxides. In particular, $Li_\alpha Ni_\beta Co_\gamma Al_\delta O_2$ ($1\leq\alpha\leq1.2$, $\beta+\gamma+\delta=1$, $\beta\geq0.7$, and $\gamma\leq0.2$) or $Li_\alpha Ni_\beta Co_\gamma Mn_\delta O_2$ ($1\leq\alpha\leq1.2$, $\beta+\gamma+\delta=1$, $\beta\geq0.6$, and $\gamma\leq0.2$) is preferable. The positive electrode active material can be used alone, or in combination with two or more kinds.

As a positive electrode binder, the same materials as a negative electrode binder can be used. Among these, from the standpoint of versatility and low cost, polyvinylidene fluorides are preferable. The amount of the positive electrode binder used is preferably 2 to 10 parts by mass with respect to 100 parts by mass of the positive electrode active material from the standpoint of "sufficient binding force" and "high energy" which are trade-offs.

As a positive electrode collector, the same materials for a negative electrode collector can be used.

For the purpose of reducing the impedance, an electroconductive auxiliary material may be added to a positive electrode active material layer containing a positive electrode active material.

Examples of the electroconductive auxiliary material include carbonaceous fine particles such as graphite, carbon black, and acetylene black.

[4] Separator

As a separator, a porous film or a nonwoven cloth of polypropylene, polyethylene, or the like can be used. A separator in which these are stacked can also be used.

[5] Package

A package can be appropriately selected as long as it is stable against an electrolyte liquid and it has a sufficient water vapor barrier property. For example, in the case of a stacked laminate type secondary battery, a lamination film of polypropylene, polyethylene, or the like which is coated with aluminum or silica is preferably used as a package. In particular, it is preferable to use an aluminum lamination film from the standpoint of reducing volume expansion.

In the case of a secondary battery in which a lamination film is used as a package, when gas is generated, a distortion of the electrode assembly becomes much larger than in the case of a secondary battery in which a metal can is used as a package. This is because the lamination film is easily deformed by the inner pressure of the secondary battery in comparison with the metal can. Further, in the case of the secondary battery in which a lamination film is used as a package, when it is sealed, the inner pressure of the battery is generally set to be lower than atmospheric pressure. Thus, the battery does not have extra space inside, which is easy to directly result in volume change of the battery and a deformation of the electrode assembly when gas is generated.

However, a secondary battery according to an exemplary embodiment of the invention can prevent the above-mentioned problem. As a result, a stacked laminate type lithium ion secondary battery which is cheap and which is superior in that there is more latitude to increase cell capacity by changing the number of laminations can be provided.

[6] Secondary Battery

The constitution of a secondary battery according to an exemplary embodiment of the invention is not particularly limited, and can be a constitution, for example, where an electrode assembly in which a positive electrode and a negative electrode are oppositely disposed and an electrolyte liquid are enclosed inside a package. A shape of the secondary battery is not particularly limited, and examples thereof include, for example, a cylindrical type, a flat wound rectangular type, a stacked rectangular type, a coin type, a flat wound laminate type, and a stacked laminate type.

Figure 1:
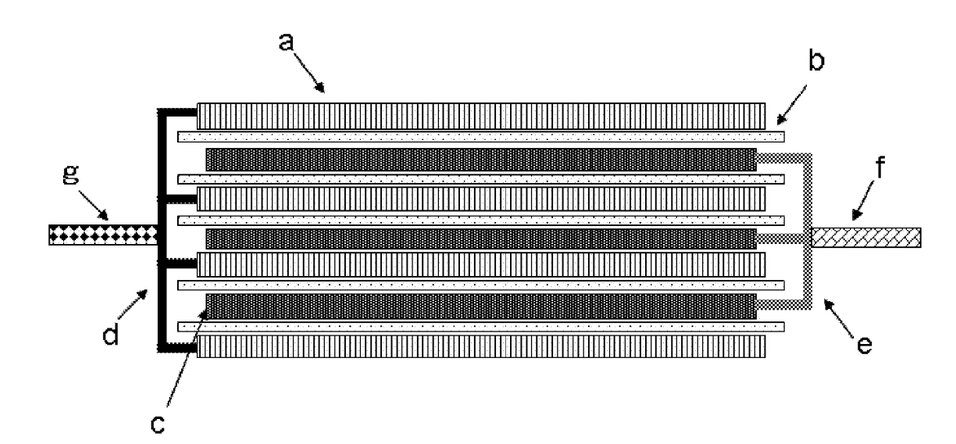
FIG. 1 is a schematic cross-sectional view showing a structure of an electrode assembly in a stacked laminate type secondary battery.

As follows, a stacked laminate type secondary battery is explained as an example. FIG. 1 is a schematic cross-sectional view showing a structure of an electrode assembly in a stacked laminate type secondary battery. This electrode assembly is formed by alternately stacking plural positive electrodes c and plural negative electrodes a with separator b placed therebetween. Positive electrode collector e in each positive electrode c is electrically connected by being welded to one another at the end part thereof which is not covered with a positive electrode active material, and further positive electrode terminal f is welded to the welded part. Negative electrode collector d in each negative electrode a is electrically connected by being welded to one another at the end part thereof which is not covered with a negative electrode active material, and further negative electrode terminal g is welded to the welded part.

Since an electrode assembly having such a planar stacked structure has no portion of a small R (a region near a winding core of a wound structure), an advantage of the electrode assembly is that it is less adversely affected by volume change of the electrode that occurs in the charge and discharge cycle than an electrode assembly having a wound structure. Therefore, the electrode assembly is useful when using an active material in which volume expansion is liable to occur. However, in the electrode assembly having a planar stacking structure, when gas is generated between the electrodes, the generated gas may easily accumulate between the electrodes. This is because, in the case of the electrode assembly having a stacking structure, it is easy to extend the space between the electrodes, while, in the case of the electrode assembly having a wound structure, the electrodes are tensioned therebetween and thereby the space between the electrodes is hard to be extended. In the case where the package is an aluminum lamination film, this problem becomes particularly significant. An exemplary embodiment of the invention can solve the above-mentioned problem, and can provide a stacked laminate type lithium ion secondary battery using a high energy type negative electrode, which enables long-life operation thereof.

EXAMPLES

As follows, an exemplary embodiment of the invention is more concretely explained by the Examples.

Example 1

Negative Electrode

A silicon simple substance, whose average particle diameter D50 measured by laser diffraction and scattering method was adjusted so as to be 5 μm, was used as a negative electrode active material. This negative electrode active material, a polyamide-imide (produced by TOYOBO CO., LTD., trade name: VYLOMAX (registered trade mark)) as a negative electrode binder, and acetylene black as an electroconductive auxiliary material were weighed at a mass ratio of 75:20:5, and they were mixed with n-methylpyrrolidone to prepare a negative electrode slurry. The negative electrode slurry was applied on a copper foil with a thickness of 10 μm and was then dried, and it was further heat-treated in nitrogen atmosphere at 300° C. to produce a negative electrode.

<Positive Electrode>

A lithium nickelate ($LiNi_{0.80}Co_{0.15}Al_{0.05}O_2$) as a positive electrode active material, carbon black as an electroconductive auxiliary material, and a polyvinylidene fluoride as a positive electrode binder were weighed at a mass ratio of 90:5:5. Then, these materials were mixed with n-methylpyrrolidone to prepare a positive electrode slurry. The positive electrode slurry was applied on an aluminum foil with a thickness of 20 μm and was then dried, and it was further pressed to produce a positive electrode.

<Electrode Assembly>

Three layers of the positive electrode obtained and four layers of the negative electrode obtained were alternately stacked with a polypropylene porous film as a separator placed therebetween. End parts of the positive electrode collectors which were not covered with the positive electrode active material and end parts of the negative electrodes collectors which were not covered with the negative electrode active material were respectively welded. Further, an aluminum positive electrode terminal and a nickel negative electrode terminal were respectively welded to the welded parts, to obtain an electrode assembly which had a planar stacking structure.

<Electrolyte Liquid>

A carbonate non-aqueous solvent and a chain-type fluorinated sulfone compound represented by formula (1) ($R^1$=$CH_2F$—, $R^2$=$CH_3$—) were mixed at 90:10 (volume ratio) to prepare a mixed solvent. $LiPF_6$ as a supporting salt was mixed with the mixed solvent at a concentration of 1 mol/l to prepare an electrolyte liquid. Note that, a solvent of EC/PC/DMC/EMC/DEC=20/20/20/20/20 (volume ratio) was used as the carbonate non-aqueous solvent. Note that, in the mixed solvent prepared, the content of the chain-type fluorinated sulfone compound is 10 vol %.

<Secondary Battery>

The above-mentioned electrode assembly was enclosed in an aluminum lamination film as a package and the electrolyte liquid was supplied to the inside. Then, it was sealed with depressurizing it to 0.1 atm to produce a secondary battery.

<Evaluation>
(Cycle Property at 55° C., Resistance Change Ratio, and Volume Increase)

A test, in which the secondary battery produced was repeatedly charged and discharged within a voltage range of 2.5 V to 4.1 V in a thermostatic oven kept at a temperature of 55° C., was carried out to evaluate the cycle maintenance rate (%), the resistance change ratio (%), and the volume increase (%). As for the charge, it was charged at 1 C to 4.1 V and the constant voltage charge was then carried out for 2.5 hours in total. As for the discharge, the constant current discharge was carried out at 1 C to 2.5 V. The results are shown in TABLE 1.

"Cycle maintenance rate (%)" was calculated by (discharge capacity after 125 cycles)/(discharge capacity after 5 cycles)×100 (unit: %).

"Resistance change ratio (%)" was calculated by (resistance value after 125 cycles)/(initial resistance value)×100 (unit: %). The initial resistance value is a resistance value in a discharged condition before cycle. The resistance was measured with AC m-ohm HiTESTER 3560 made by HIOKI.

"Volume increase (%)" was calculated by {(volume after 125 cycles)/(volume before cycle)−1}×100 (unit: %).

Examples 2 to 13

Secondary batteries were produced and evaluated in the same manner as in Example 1 except that a compound described in TABLE 1 was used as the chain-type fluorinated sulfone compound. The results are shown in TABLE 1.

Comparative Example 1

A secondary battery was produced and evaluated in the same manner as in Example 1 except that the chain-type fluorinated sulfone compound was not used. The results are shown in TABLE 1.

Comparative Examples 2 and 3

Secondary batteries were produced and evaluated in the same manner as in Example 1 except that the chain-type fluorinated sulfone compound was not used and a chain-type sulfone compound described in TABLE 1 was used instead. The results are shown in TABLE 1.

TABLE 1

| | electrolyte liquid chain-type fluorinated sulfone compound | | | negative electrode | | | cycle maintenance rate (%) | resistance change ratio (%) | volume increase (%) |
|---|---|---|---|---|---|---|---|---|---|
| | | | | negative electrode active material | binder resin | | | | |
| | R1 | R2 | content (%) | | kind | content (%) | | | |
| Ex. 1 | CH2F— | CH3— | 10 | Si | PAI | 15 | 41 | 310 | 18.3 |
| Ex. 2 | CHF2— | CH3— | 10 | Si | PAI | 15 | 42 | 292 | 18.8 |
| Ex. 3 | CHF2— | CH2F— | 10 | Si | PAI | 15 | 46 | 311 | 16.6 |
| Ex. 4 | CHF2— | CHF2— | 10 | Si | PAI | 15 | 45 | 314 | 14.9 |
| Ex. 5 | CH2FCH2— | CH3— | 10 | Si | PAI | 15 | 47 | 285 | 16.6 |
| Ex. 6 | CHF2CH2— | CH3— | 10 | Si | PAI | 15 | 45 | 298 | 17.2 |
| Ex. 7 | CHF2CH2— | CH3CH2— | 10 | Si | PAI | 15 | 44 | 320 | 18.7 |
| Ex. 8 | CHF2CH2— | CH2FCH2— | 10 | Si | PAI | 15 | 42 | 292 | 16.1 |
| Ex. 9 | CHF2CH2— | CH3CH2CH2— | 10 | Si | PAI | 15 | 42 | 315 | 20.5 |
| Ex. 10 | CHF2CH2— | CH3(CH3)CH— | 10 | Si | PAI | 15 | 42 | 329 | 20.1 |
| Ex. 11 | CHF2CH2— | Ph— | 10 | Si | PAI | 15 | 41 | 283 | 21.3 |
| Ex. 12 | CHF2CH2— | CH3—Ph— | 10 | Si | PAI | 15 | 41 | 293 | 18.8 |
| Ex. 13 | CHF2CH2— | Ph—CH2— | 10 | Si | PAI | 15 | 42 | 285 | 20.4 |
| Comp. Ex. 1 | — | — | — | Si | PAI | 15 | 13 | 353 | 70.0 |
| Comp. Ex. 2 | CH3— | CH3— | 10 | Si | PAI | 15 | 37 | 338 | 26.9 |
| Comp. Ex. 3 | CH3CH2— | CH3CH2— | 10 | Si | PAI | 15 | 35 | 344 | 31.4 |

Note that, in Example 1, the initial resistance value was 17.8 nm, and the resistance value after 125 cycles was 55.2 nm. In Example 4, the initial resistance value was 16.6 nm, and the resistance value after 125 cycles was 52.1 nm. In Comparative Example 1, the initial resistance value was 22.7 nm, and the resistance value after 125 cycles was 80.1 nm.

Example 14

A secondary battery was produced and evaluated in the same manner as in Example 1 except that a Si/SiO/C complex (CVD method) was used as the negative electrode active material instead of the silicon simple substance. The results are shown in TABLE 2.

The Si/SiO/C complex (CVD method) was obtained by carrying our CVD processing in an atmosphere containing methane gas at 1150° C. for 6 hours. The Si/SiO/C complex had a structure in which particles comprised of a silicon and a silicon oxide were covered with carbon. Also, the silicon was a nanocluster in the silicon oxide. Also, the mass ratio of Si/SiO/C was adjusted so as to be approximately 29/61/10. The average particle diameter $D_{50}$ of the Si/SiO/C complex was approximately 5 µm.

Examples 15 to 26

Secondary batteries were produced and evaluated in the same manner as in Example 14 except that a compound described in TABLE 2 was used as the chain-type fluorinated sulfone compound. The results are shown in TABLE 2.

Examples 32 and 33

Secondary batteries were produced and evaluated in the same manner as in Example 31 except that a compound described in TABLE 4 was used as the chain-type fluorinated sulfone compound. The results are shown in TABLE 4.

TABLE 2

| | electrolyte liquid chain-type fluorinated sulfone compound | | | negative electrode | | | cycle maintenance rate (%) | resistance change ratio (%) | volume increase (%) |
|---|---|---|---|---|---|---|---|---|---|
| | | | | negative electrode active | binder resin | | | | |
| | R1 | R2 | content (%) | material | kind | content (%) | | | |
| Ex. 14 | CH2F— | CH3— | 10 | Si/SiO/C | PAI | 15 | 49 | 274 | 13.3 |
| Ex. 15 | CHF2— | CH3— | 10 | Si/SiO/C | PAI | 15 | 50 | 254 | 11.1 |
| Ex. 16 | CHF2— | CH2F— | 10 | Si/SiO/C | PAI | 15 | 53 | 275 | 13.5 |
| Ex. 17 | CHF2— | CHF2— | 10 | Si/SiO/C | PAI | 15 | 54 | 278 | 8.3 |
| Ex. 18 | CH2FCH2— | CH3— | 10 | Si/SiO/C | PAI | 15 | 55 | 248 | 10.0 |
| Ex. 19 | CHF2CH2— | CH3— | 10 | Si/SiO/C | PAI | 15 | 53 | 256 | 11.8 |
| Ex. 20 | CHF2CH2— | CH3CH2— | 10 | Si/SiO/C | PAI | 15 | 52 | 280 | 8.5 |
| Ex. 21 | CHF2CH2— | CH2FCH2— | 10 | Si/SiO/C | PAI | 15 | 50 | 251 | 10.4 |
| Ex. 22 | CHF2CH2— | CH3CH2CH2— | 10 | Si/SiO/C | PAI | 15 | 49 | 283 | 9.6 |
| Ex. 23 | CHF2CH2— | CH3(CH3)CH— | 10 | Si/SiO/C | PAI | 15 | 50 | 288 | 10.1 |
| Ex. 24 | CHF2CH2— | Ph— | 10 | Si/SiO/C | PAI | 15 | 51 | 243 | 11.5 |
| Ex. 25 | CHF2CH2— | CH3—Ph— | 10 | Si/SiO/C | PAI | 15 | 49 | 252 | 12.6 |
| Ex. 26 | CHF2CH2— | Ph—CH2— | 10 | Si/SiO/C | PAI | 15 | 50 | 247 | 13.9 |

Examples 27 to 30

Secondary batteries were produced and evaluated in the same manner as in Example 17 except that the content (vol %) of the chain-type fluorinated sulfone compound in the mixed solvent was set to be a value shown in TABLE 3. The results are shown in TABLE 3.

Example 34

A secondary battery was produced and evaluated in the same manner as in Example 1 except that the Si/SiO/C complex (mechanical method) was used as the negative electrode active material instead of the silicon simple substance. The results are shown in TABLE 1.

TABLE 3

| | electrolyte liquid chain-type fluorinated sulfone compound | | | negative electrode | | | cycle maintenance rate (%) | resistance change ratio (%) | volume increase (%) |
|---|---|---|---|---|---|---|---|---|---|
| | | | | negative electrode active | binder resin | | | | |
| | R1 | R2 | content (%) | material | kind | content (%) | | | |
| Ex. 27 | CHF2— | CHF2— | 1 | Si/SiO/C | PAI | 15 | 45 | 254 | 13.9 |
| Ex. 28 | CHF2— | CHF2— | 5 | Si/SiO/C | PAI | 15 | 53 | 262 | 10.5 |
| Ex. 29 | CHF2— | CHF2— | 15 | Si/SiO/C | PAI | 15 | 46 | 302 | 12.2 |
| Ex. 30 | CHF2— | CHF2— | 20 | Si/SiO/C | PAI | 15 | 42 | 313 | 8.9 |

Example 31

A secondary battery was produced and evaluated in the same manner as in Example 1 except that a Si—Sn alloy was used as the negative electrode active material instead of the silicon simple substance. The results are shown in TABLE 4. The average particle diameter $D_{50}$ of the Si—Sn alloy was approximately 5 µm. The Si—Sn alloy was obtained by mixing metal Si particle with an average particle diameter D50 of approximately 7 µm and metal Sn particle with an average particle diameter D50 of approximately 7 µm by so-called mechanical milling method for 8 h.

The Si/SiO/C complex (mechanical method) was produced by the following methods. First, a silicon with an average particle diameter of 5 µm, an amorphous silicon oxide ($SiO_x$, $0<x\leq2$) with an average particle diameter of 13 µm, and a graphite with an average particle diameter of 30 µm were weighed at a mass ratio of 29:61:10. And, these materials were mixed by so-called mechanical milling for 24 hours to obtain a Si/SiO/C complex (mechanical method). Note that, in this negative electrode active material, the silicon was dispersed in the silicon oxide ($SiO_x$, $0<x\leq2$).

Example 35

A secondary battery was produced and evaluated in the same manner as in Example 17 except that a polyimide (produced by UBE INDUSTRIES, trade name: U varnish A) was used as the binder resin. The results are shown in TABLE 4.

TABLE 4

| | electrolyte liquid chain-type fluorinated sulfone compound | | | negative electrode active material | binder resin | | cycle maintenance rate (%) | resistance change ratio (%) | volume increase (%) |
|---|---|---|---|---|---|---|---|---|---|
| | R1 | R2 | content (%) | | kind | content (%) | | | |
| Ex. 31 | CH2F— | CH3— | 10 | Si—Sn alloy | PAI | 15 | 42 | 279 | 18.2 |
| Ex. 32 | CHF2— | CH2F— | 10 | Si—Sn alloy | PAI | 15 | 44 | 268 | 18.6 |
| Ex. 33 | CHF2— | CHF2— | 10 | Si—Sn alloy | PAI | 15 | 45 | 282 | 17.6 |
| Ex. 34 | CHF2— | CHF2— | 10 | Si/SiO/C (Mechanical) | PAI | 15 | 51 | 288 | 13.1 |
| Ex. 35 | CHF2— | CHF2— | 10 | Si/SiO/C | PI | 15 | 52 | 280 | 13.5 |

Example 36

A secondary battery was produced and evaluated in the same manner as in Example 14 except that an electrolyte liquid prepared as following was used. The results are shown in TABLE 5.

A carbonate non-aqueous solvent, a chain-type fluorinated sulfone compound ($R^1$=CH$_2$F—, $R^2$=CH$_3$—), and a fluorinated ether (H—CF$_2$CF$_2$—CH$_2$O—CF$_2$CF$_2$—H) were mixed at 70:10:20 (volume ratio) to prepare a mixed solvent. LiPF$_6$ as the supporting salt was mixed with the mixed solvent so that the concentration thereof was 1 mol/l to obtain an electrolyte liquid. Note that, a solvent with EC/PC/DMC/EMC/DEC=20/20/20/20/20 (volume ratio) was used as the carbonate non-aqueous solvent.

Examples 37 to 48

Secondary batteries were produced and evaluated in the same manner as in Example 36 except that a compound described in TABLE 5 was used as the chain-type fluorinated sulfone compound. The results are shown in TABLE 5.

TABLE 5

| | electrolyte liquid | | | | | cycle maintenance rate (%) | resistance change ratio (%) | volume increase (%) |
|---|---|---|---|---|---|---|---|---|
| | chain-type fluorinated sulfone compound | | | chain-type fluorinated ether compound | | | | |
| | R1 | R2 | content (%) | kind | content (%) | | | |
| Ex. 36 | CH2F— | CH3— | 10 | H—CF2CF2—CH2O—CF2CF2—H | 20 | 62 | 145 | 4.1 |
| Ex. 37 | CHF2— | CH3— | 10 | H—CF2CF2—CH2O—CF2CF2—H | 20 | 65 | 133 | 4.9 |
| Ex. 38 | CHF2— | CH2F— | 10 | H—CF2CF2—CH2O—CF2CF2—H | 20 | 67 | 121 | 4.1 |
| Ex. 39 | CHF2— | CHF2— | 10 | H—CF2CF2—CH2O—CF2CF2—H | 20 | 68 | 116 | 3.3 |
| Ex. 40 | CH2FCH2— | CH3— | 10 | H—CF2CF2—CH2O—CF2CF2—H | 20 | 61 | 151 | 3.9 |
| Ex. 41 | CHF2CH2— | CH3— | 10 | H—CF2CF2—CH2O—CF2CF2—H | 20 | 64 | 124 | 3.1 |
| Ex. 42 | CHF2CH2— | CH3CH2— | 10 | H—CF2CF2—CH2O—CF2CF2—H | 20 | 63 | 133 | 3.6 |
| Ex. 43 | CHF2CH2— | CH2FCH2— | 10 | H—CF2CF2—CH2O—CF2CF2—H | 20 | 65 | 119 | 3.8 |
| Ex. 44 | CHF2CH2— | CH3CH2CH2— | 10 | H—CF2CF2—CH2O—CF2CF2—H | 20 | 59 | 153 | 4.0 |
| Ex. 45 | CHF2CH2— | CH3(CH3)CH— | 10 | H—CF2CF2—CH2O—CF2CF2—H | 20 | 63 | 144 | 3.9 |
| Ex. 46 | CHF2CH2— | Ph— | 10 | H—CF2CF2—CH2O—CF2CF2—H | 20 | 67 | 131 | 4.1 |
| Ex. 47 | CHF2CH2— | CH3—Ph— | 10 | H—CF2CF2—CH2O—CF2CF2—H | 20 | 63 | 136 | 5.0 |
| Ex. 48 | CHF2CH2— | Ph—CH2— | 10 | H—CF2CF2—CH2O—CF2CF2—H | 20 | 64 | 129 | 4.3 |

Note that, in Example 36, the initial resistance value was 40.4 nm, and the resistance value after 125 cycles was 58.5 nm. In Example 39, the initial resistance value was 41.8 nm, and the resistance value after 125 cycles was 48.5 nm.

Examples 49 to 53

Secondary batteries were produced and evaluated in the same manner as in Example 39 except that the content (vol %) of the chain-type fluorinated ether in the mixed solvent was set to be a value shown in TABLE 6. The results are shown in TABLE 6.

TABLE 6

| | electrolyte liquid | | | | | cycle | resistance | volume |
| | chain-type fluorinated sulfone compound | | | chain-type fluorinated ether compound | | maintenance | change | increase |
| | R1 | R2 | content (%) | kind | content (%) | ratio (%) | ratio (%) | (%) |
|---|---|---|---|---|---|---|---|---|
| Ex. 49 | CHF2— | CHF2— | 10 | H—CF2CF2—CH2O—CF2CF2—H | 10 | 58 | 143 | 5.9 |
| Ex. 50 | CHF2— | CHF2— | 10 | H—CF2CF2—CH2O—CF2CF2—H | 15 | 61 | 131 | 5.1 |
| Ex. 51 | CHF2— | CHF2— | 10 | H—CF2CF2—CH2O—CF2CF2—H | 25 | 65 | 123 | 3.3 |
| Ex. 52 | CHF2— | CHF2— | 10 | H—CF2CF2—CH2O—CF2CF2—H | 30 | 62 | 126 | 3.5 |
| Ex. 53 | CHF2— | CHF2— | 10 | H—CF2CF2—CH2O—CF2CF2—H | 35 | 55 | 121 | 3.1 |

Examples 54 to 57

Secondary batteries were produced and evaluated in the same manner as in Example 39 except that a compound described in TABLE 7 was used as the chain-type fluorinated ether. The results are shown in TABLE 7.

a submarine, and which includes an electric vehicle such as an electric car, a hybrid car, an electric motorcycle and an electric power-assisted bicycle; a back-up power supply such as UPS; and a power storage device of an electric power which is generated by a solar power generation or a wind power generation.

TABLE 7

| | electrolyte liquid | | | | | cycle | resistance | volume |
| | chain-type fluorinated sulfone compound | | | chain-type fluorinated ether compound | | maintenance | change | increase |
| | R1 | R2 | content (%) | kind | content (%) | ratio (%) | ratio (%) | (%) |
|---|---|---|---|---|---|---|---|---|
| Ex. 54 | CHF2— | CHF2— | 10 | CH2F—O—CH2CH3 | 20 | 56 | 146 | 5.1 |
| Ex. 55 | CHF2— | CHF2— | 10 | CH2F—O—CH2CH2F | 20 | 59 | 154 | 4.8 |
| Ex. 56 | CHF2— | CHF2— | 10 | H—CF2CF2—CH2O—CH2CH2—H | 20 | 58 | 130 | 3.2 |
| Ex. 57 | CHF2— | CHF2— | 10 | H—CF2CHF—CH2O—CF2CHF—H | 20 | 59 | 121 | 3.1 |

From TABLE 1, it has been confirmed that the cycle maintenance rate and the resistance change ratio at a high temperature are significantly improved by using an electrolyte liquid containing a chain-type fluorinated sulfone compound.

From TABLE 2, it has been found that a secondary battery in which the cycle maintenance rate and the resistance change are further improved can be obtained by using an electrolyte liquid containing a chain-type fluorinated sulfone compound and a negative electrode containing a Si/SiO/C complex.

From TABLE 5, it has been found that the cycle maintenance rate is further improved and that the resistance change ratio is significantly improved, by using an electrolyte liquid containing a chain-type fluorinated ether in addition to a chain-type fluorinated sulfone compound.

The present application claims the priority based on Japanese Patent Application No. 2011-070108, filed on Mar. 28, 2011, all the disclosure of which is incorporated herein by reference.

The present invention was explained with reference to embodiments and Examples, but the present invention is not limited to the above-mentioned embodiments and the Examples. In the constituents and the detail of the present invention, various changings which are understood by a person ordinarily skilled in the art can be made within the scope of the invention.

INDUSTRIAL APPLICABILITY

An exemplary embodiment of the invention can be utilized in every industrial field that requires a power supply and in an industrial field concerning a transportation, a storage and a supply of an electrical energy. Specifically, it can be utilized, for examples, for a power supply of a mobile device such as a mobile phone and a laptop computer; a power supply of a moving or a transport medium such as a train, a satellite and

REFERENCE SIGNS LIST a negative electrode
b separator
c positive electrode
d negative electrode collector
e positive electrode collector
f positive electrode terminal
g negative electrode terminal

What is claimed is:

1. A secondary battery, comprising: a positive electrode, a negative electrode comprising a negative electrode active material, and an electrolyte liquid;
wherein the negative electrode active material comprises a metal (a) that can be alloyed with lithium and wherein the metal (a) is silicon;
wherein the electrolyte liquid comprises a chain fluorinated sulfone compound represented by following formula (1):

(1)

wherein, in formula (1), $R_1$ and $R_2$ each independently denote a substituted or non-substituted alkyl group or a substituted or non-substituted aryl group, and at least one of $R_1$ and $R_2$ is $CH_2F—$, $CHF_2—$, $CH_2FCH_2—$, or $CHF_2CH_2—$, and wherein the electrolyte liquid further comprises a chain fluorinated ether compound represented by following formula (2):

$$R_a\text{—}O\text{—}R_b \quad (2)$$

wherein, in formula (2), $R_a$ and $R_b$ each independently denote an alkyl group or a fluorine-substituted alkyl group, and at least one of $R_a$ and $R_b$ is a fluorine-substituted alkyl group.

2. The secondary battery according to claim 1, wherein one of $R_1$ and $R_2$ is $CH_2F$—, $CHF_2$—, $CH_2FCH_2$—, or $CHF_2CH_2$—, and the other is a fluorine-substituted alkyl group.

3. The secondary battery according to claim 1, wherein $R_1$ and $R_2$ are each independently $CH_2F$—, $CHF_2$—, $CH_2FCH_2$—, or $CHF_2CH_2$—.

4. The secondary battery according to claim 1, wherein one of $R_1$ and $R_2$ is $CH_2F$—, $CHF_2$—, $CH_2FCH_2$—, or $CHF_2CH_2$—, and wherein the other is an alkyl group with a carbon number of 1 to 6 which may be substituted by an aryl group or is an aryl group with a carbon number of 6 to 10 which may be substituted by an alkyl group.

5. The secondary battery according to claim 1, wherein the chain fluorinated ether compound is represented by following formula (3);

$$H\text{—}(CX^1X^2\text{—}CX^3X^4)_n\text{—}CH_2O\text{—}CX^5X^6\text{—}CX^7X^8\text{—}H \quad (3)$$

wherein, in formula (3), n is 1, 2, 3, or 4, and $X^1$ to $X^8$ are each independently fluorine atom or hydrogen atom provided that at least one of $X^1$ to $X^4$ is fluorine atom and at least one of $X^5$ to $X^8$ is fluorine atom.

6. The secondary battery according to claim 1, wherein the electrolyte liquid further comprises a carbonate compound.

7. The secondary battery according to claim 6, wherein the content of the chain fluorinated sulfone compound is 1 to 15 vol % with respect to the total of the chain fluorinated sulfone compound, the chain fluorinated ether compound, and a solvent;

wherein the content of the chain fluorinated ether compound is 10 to 35 vol % with respect to the total of the chain fluorinated sulfone compound, the chain fluorinated ether compound, and the solvent; and wherein the content of the carbonate compound is 30 to 89 vol % with respect to the total of the chain fluorinated sulfone compound, the chain fluorinated ether compound, and the solvent.

8. The secondary battery according to claim 1, wherein the negative electrode active material further comprises a metal oxide (b) that can absorb and desorb lithium ion and a carbon material (c) that can absorb and desorb lithium ion.

9. The secondary battery according to claim 8, wherein the metal oxide (b) is silicon oxide.

10. The secondary battery according to claim 9, where at least a part of the silicon oxide has an amorphous structure, and at least a part of the silicon is dispersed in the silicon oxide.

11. The secondary battery according to claim 1, wherein the negative electrode comprises a binder, and the binder is a polyimide or a polyamide-imide.

12. The secondary battery according to claim 1, which has a stacked laminate structure.

13. The secondary battery according to claim 12, comprising a package, wherein the package is an aluminum laminate film.

14. The secondary battery according to claim 1, wherein the negative electrode active material comprises a silicon-lithium alloy.

* * * * *